(12) United States Patent
Wang et al.

(10) Patent No.: US 11,919,790 B2
(45) Date of Patent: Mar. 5, 2024

(54) ANAEROBIC-AO-SACR COMBINED ADVANCED NITROGEN REMOVAL SYSTEM AND TECHNOLOGY FOR HIGH AMMONIA-NITROGEN WASTEWATER

(71) Applicant: SHANDONG JIANZHU UNIVERSITY, Shandong (CN)

(72) Inventors: Kai Wang, Shandong (CN); Daoji Wu, Shandong (CN); Fengxun Tan, Shandong (CN); Congwei Luo, Shandong (CN); Xiaoxiang Cheng, Shandong (CN); Hongye Li, Shandong (CN); Yu Tian, Shandong (CN)

(73) Assignee: SHANDONG JIANZHU UNIVERSITY, Shandong (CN)

( * ) Notice: Subject to any disclaimer, the term of this patent is extended or adjusted under 35 U.S.C. 154(b) by 0 days.

(21) Appl. No.: 17/769,581

(22) PCT Filed: Sep. 11, 2020

(86) PCT No.: PCT/CN2020/114717
§ 371 (c)(1),
(2) Date: Apr. 15, 2022

(87) PCT Pub. No.: WO2021/077936
PCT Pub. Date: Apr. 29, 2021

(65) Prior Publication Data
US 2023/0159361 A1 May 25, 2023

(30) Foreign Application Priority Data
Oct. 25, 2019 (CN) .......................... 201911025152.6

(51) Int. Cl.
*C02F 3/30* (2023.01)
*C02F 101/16* (2006.01)

(52) U.S. Cl.
CPC .......... *C02F 3/302* (2013.01); *C02F 2101/16* (2013.01); *C02F 2209/005* (2013.01);
(Continued)

(58) Field of Classification Search
CPC .. C02F 2101/16; C02F 3/02; C02F 2001/007; C02F 3/30; C02F 3/302; C02F 2301/08;
(Continued)

(56) References Cited

FOREIGN PATENT DOCUMENTS

| CN | 101279794 A1 | 10/2008 |
| CN | 101805096 A | 8/2010 |

(Continued)

*Primary Examiner* — Claire A Norris
(74) *Attorney, Agent, or Firm* — Global IP Services; Tianhua Gu

(57) ABSTRACT

An anaerobic-AO-SACR combined advanced nitrogen removal system for high ammonia-nitrogen wastewater, in which high ammonia-nitrogen wastewater first enters an anaerobic reactor to remove most of organic matters from the wastewater, effluent water enters an AO reactor for nitrogen removal by pre-denitrification in an anoxic zone and for removal of the remaining organic matters and nitrification of ammonia nitrogen in an aerobic zone, and then the effluent water enters an intermediate pool. Meanwhile, under the control of a water quality testing device and a PLC controller, a part of raw water is introduced into the intermediate pool to adjust the carbon nitrogen ratio of the wastewater. Then, the effluent water enters an SACR reactor, and the wastewater undergoes pre-denitrification-nitrification-endogenous denitrification precisely by using the characteristics of denitrifying bacteria and through adjustment and control of PH/DO/ORP testers and the PLC controller on the SACR reactor so as to realize advanced nitrogen removal.

9 Claims, 3 Drawing Sheets

(52) U.S. Cl.
CPC ...... *C02F 2209/04* (2013.01); *C02F 2209/06* (2013.01); *C02F 2209/22* (2013.01); *C02F 2209/44* (2013.01)

(58) Field of Classification Search
CPC .... C02F 3/28; C02F 3/286; C02F 9/00; C02F 2209/04; C02F 2209/06; C02F 2209/22
USPC ........................................................ 210/605
See application file for complete search history.

(56) References Cited

FOREIGN PATENT DOCUMENTS

| | | | |
|---|---|---|---|
| CN | 103936149 | A | 7/2014 |
| CN | 104098227 | A1 | 10/2014 |
| CN | 104944582 | A | 9/2015 |
| CN | 109354190 | A | 2/2019 |
| CN | 110642474 | A | 1/2020 |
| WO | 2011129493 | A1 | 10/2011 |

# ANAEROBIC-AO-SACR COMBINED ADVANCED NITROGEN REMOVAL SYSTEM AND TECHNOLOGY FOR HIGH AMMONIA-NITROGEN WASTEWATER

CROSS REFERENCE TO RELATED PATENT APPLICATION

The present application is the US national stage of PCT/CN2020/114717 filed on 2020 Sep. 11, which claims the priority of the Chinese patent application No. 201911025152.6 filed on 2019 Oct. 25, which application is incorporated herein by reference.

TECHNICAL FIELD OF THE INVENTION

The present invention relates to the technical field of wastewater treatment and particularly relates to an anaerobic-AO-SACR combined advanced nitrogen removal system and technology for high ammonia-nitrogen wastewater.

BACKGROUND OF THE INVENTION

At present, with the strengthening of environmental protection awareness, the strengthening of environmental pollution control and the development of environmental protection technologies, water pollution is effectively controlled initially, but the standard discharge of high ammonia-nitrogen wastewater common in industrial production is still a problem to be urgently solved. High ammonia-nitrogen wastewater mainly comes from industries such as chemical fertilizer, petrochemical industry, cultivation and garbage treatment, and in the aspect of treatment of high ammonia-nitrogen wastewater, not only the technical index of efficient nitrogen removal is pursued, but also energy consumption reduction, energy saving and operation and treatment cost reduction are considered.

Nowadays, the A/O technology is one of the main technologies for the treatment of high ammonia-nitrogen wastewater at home and abroad. Although the A/O technology has an independent anoxic zone for denitrification, and the nitrogen removal speed is high, the nitrogen removal rate is not high because of pre-denitrification. In order to improve the nitrogen removal efficiency, the internal cycle ratio must be increased, thus increasing the operating cost. In addition, the internal circulating liquid comes from the aeration pool and contain definite DO so that it is difficult for the anoxic zone to maintain an ideal anoxic condition, affecting the denitrification effect, and the nitrogen removal rate is difficult to reach 90%.

SUMMARY OF THE INVENTION

To solve the defects in the prior art, the present invention provides an anaerobic-AO-SACR combined advanced nitrogen removal system and technology for high ammonia-nitrogen wastewater, which can carry out advanced nitrogen removal for high ammonia-nitrogen wastewater, no additional carbon source is required, and the technology processing cost is low; moreover, the technology of the technical solution can be implemented by only adding an intermediate pool and an SACR reactor for established wastewater treatment facilities using the AO technology without complete reconstruction to achieve the effect of advanced nitrogen removal, which effectively controls the cost of upgrading and reconstruction; and the specific technical solution is as follows:

The present invention firstly provides an anaerobic-AO-SACR combined advanced nitrogen removal system for high ammonia-nitrogen wastewater, comprising:

An adjusting pool, an anaerobic reactor, an AO reactor, a sedimentation pool, an intermediate pool and an SACR reactor which are communicated in sequence through pipelines, wherein the full name of the SACR reactor is self-carbon source adaptive reactor;

The outlet end of the adjusting pool is communicated with the inlet end of the intermediate pool through a pipeline, and the pipeline is provided with a water pump for adjusting the flow;

The intermediate pool is provided with a water quality testing device;

The AO reactor is divided into an anoxic zone and an aerobic zone, and provided with a nitrification liquid reflux pump for a part of nitrification liquid obtained by separation of sludge and water in the sedimentation pool to return to the anoxic zone and a sludge reflux pump for a part of sludge obtained by separation of sludge and water in the sedimentation pool to return to the anoxic zone;

The SACR reactor is provided with a PH tester, a DO tester, an ORP tester, an aerator and an agitator; The full name of the SACR reactor is self-carbon source adaptive reactor, and the working principle is as follows: after entering the SACR reactor from the intermediate pool, wastewater first undergoes anoxic agitation and nitrogen removal by pre-denitrification, and carbon sources are stored; when the pH value changes from increase to decrease, the pre-denitrification in the SACR reactor is over; after T hours, agitation is stopped, and aerated nitrification is started; when the pH value in the SACR reactor changes from decrease to increase, and DO substantially increases, the nitrification in the SACR reactor is over; at this time, aeration is closed, agitation is continued, endogenous denitrification is started, and the change of ORP in the SACR reactor is observed; when the ORP in the SACR reactor decreases rapidly, the denitrification in the SACR reactor is over; and at this time, agitation is closed, and sedimentation and drainage are carried out;

The anaerobic-AO-SACR combined advanced nitrogen removal system for high ammonia-nitrogen wastewater further comprises a PLC controller, wherein the PLC controller is respectively in communication connection with the water quality testing device, the PH tester, the DO tester, the ORP tester, the aerator and the agitator.

In some specific embodiments of the present invention, the anaerobic-AO-SACR combined advanced nitrogen removal system for high ammonia-nitrogen wastewater further comprises a computer, wherein the computer is in communication connection with the PLC controller.

In some specific embodiments of the present invention, the AO reactor is divided into an anoxic zone and an aerobic zone, and the volume of the anoxic zone and the volume of the aerobic zone are determined according to the output of wastewater and the total nitrogen concentration of pollutants;

The specific calculation method is: volume of anoxic zone=a×(total nitrogen concentration of high ammonia-nitrogen wastewater/50×3×wastewater output per hour) $m^3$, and volume of aerobic zone=a×(total nitrogen concentration of high ammonia-nitrogen wastewater/50×12×wastewater output per hour) $m^3$; wherein a ranges from 1 to 1.5, the total nitrogen concentration of the high ammonia-nitrogen wastewater is in mg/L, and the wastewater output per hour is in $m^3$.

In some specific embodiments of the present invention, the volume of the SACR reactor is determined according to the output of wastewater and the concentration of pollutants;

The specific calculation method is: volume of SACR=a×(total nitrogen concentration of high ammonia-nitrogen wastewater/50×20×wastewater output per hour) m$^3$; wherein a ranges from 1 to 1.5, the total nitrogen concentration of the high ammonia-nitrogen wastewater is in mg/L, and the wastewater output per hour is in m$^3$.

The present invention also provides a technology for treating high ammonia-nitrogen wastewater by the nitrogen removal system through the anaerobic-AO-SACR combined technology, comprising:

(1) High ammonia-nitrogen wastewater enters the anaerobic reactor from the adjusting pool, macromolecular and refractory organic matters in the high ammonia-nitrogen wastewater are decomposed into small molecules, and most of organic matters in the high ammonia-nitrogen wastewater are removed;

(2) The effluent water of the anaerobic reactor enters the AO reactor for pre-denitrification in the anoxic zone and aerobic nitrification in the aerobic zone; sludge water mixture undergoes sludge water separation in the sedimentation pool, one part of effluent water enters the intermediate pool, and the other part returns to the front end of the anoxic zone through the nitrification liquid reflux pump of the AO reactor for pre-denitrification; and one part of sludge returns to the front end of the anoxic zone through the sludge reflux pump of the AO reactor, and the other part is drained as the remaining sludge;

(3) The effluent water of the AO reactor enters the intermediate pool, and meanwhile, under the adjustment and control of the water quality testing device and the PLC controller, a part of high ammonia-nitrogen wastewater is introduced by the water pump into the intermediate pool from the adjusting pool to adjust the carbon nitrogen ratio of the wastewater; and the adjustment rule of the carbon nitrogen ratio of the wastewater is: COD concentration of mixed wastewater=total nitrogen concentration of effluent water of AO reactor×b+ammonia nitrogen concentration of 15 influent water of intermediate pool×b, wherein b ranges from 4 to 6;

(4) After entering the SACR reactor from the intermediate pool, the wastewater first undergoes anoxic agitation; when the pH value changes from increase to decrease, the pre-denitrification in the SACR reactor is over; after T hours, agitation is stopped, and aerated nitrification is started; when the pH value in the SACR reactor changes from decrease to increase, and DO substantially increases, the nitrification in the SACR reactor is over; at this time, aeration is closed, agitation is continued, endogenous denitrification is started, and the change of ORP in the SACR reactor is observed; when the ORP in the SACR reactor decreases rapidly, the denitrification in the SACR reactor is over; and at this time, agitation is closed, and sedimentation and drainage are carried out.

In some specific embodiments of the present invention, T ranges from 0 to 2.

In some specific embodiments of the present invention, the carbon nitrogen ratio of influent water of the anaerobic reactor is more than 5:1, and the volume load of the anaerobic reactor is 4-8 KgCOD/m$^3$·day.

In some specific embodiments of the present invention, the sludge concentration of the AO technology is controlled at 4000 mg/L-5000 mg/L, the reflux ratio of nitrification liquid is 100%-200%, and the reflux ratio of sludge is 50%-100%.

In some specific embodiments of the present invention, the sludge concentration of the SACR technology is controlled at 5000 mg/L-8000 mg/L, the drainage ratio is controlled at 25%-30%, the inflow time is 30-60 min, and the sedimentation time is 60-90 min.

The present invention has the following beneficial effects:
1. The present invention provides an advanced nitrogen removal system and technology for high ammonia-nitrogen wastewater, which can achieve the purpose of advanced nitrogen removal of high ammonia-nitrogen wastewater by adding the intermediate pool and the SACR reactor on the basis of the existing wastewater treatment system using the AO technology to enable the quality of the effluent water to meet the increasingly strict environmental protection requirements;
2. The compatibility with the existing wastewater treatment system using the AO technology is strong, no reconstruction of the existing wastewater treatment facilities is required, and the cost of upgrading and reconstruction is low;
3. The total nitrogen removal rate is high, the total nitrogen removal rate of the AO technology can reach 70%-80%, the total nitrogen removal rate of SACR can reach more than 95%, and the total nitrogen removal rate of the final effluent water of the system can stably reach more than 95%;
4. The water retention time is short, the nitrogen removal efficiency is high, and the operation cost is effectively reduced;
5. No additional carbon source is required, and the technology processing cost is effectively reduced;
6. The characteristics of high total nitrogen removal rate, high nitrogen removal efficiency and low operation and maintenance cost enable the system and technology to be used as a new advanced nitrogen removal system and technology for high ammonia-nitrogen wastewater for large-scale commercial application.

BRIEF DESCRIPTION OF THE DRAWINGS

To more clearly describe the technical solutions in the embodiments of the present invention or in the prior art, the drawings required to be used in the description of the embodiments or the prior art will be simply presented below. Obviously, the drawings in the following description are merely some embodiments of the present invention, and for those ordinary skilled in the art, other drawings can also be obtained according to the drawings without contributing creative labor.

DETAILED DESCRIPTION OF THE INVENTION

The technical solution in the embodiments of the present invention will be clearly and fully described below in combination with the drawings in the embodiments of the present invention. Apparently, the described embodiments are merely part of the embodiments of the present invention, not used for limiting the protection scope of the present invention. Based on the embodiments in the present invention, all other embodiments obtained by those ordinary skilled in the art without contributing creative labor will belong to the protection scope of the present invention.

Figure 1:
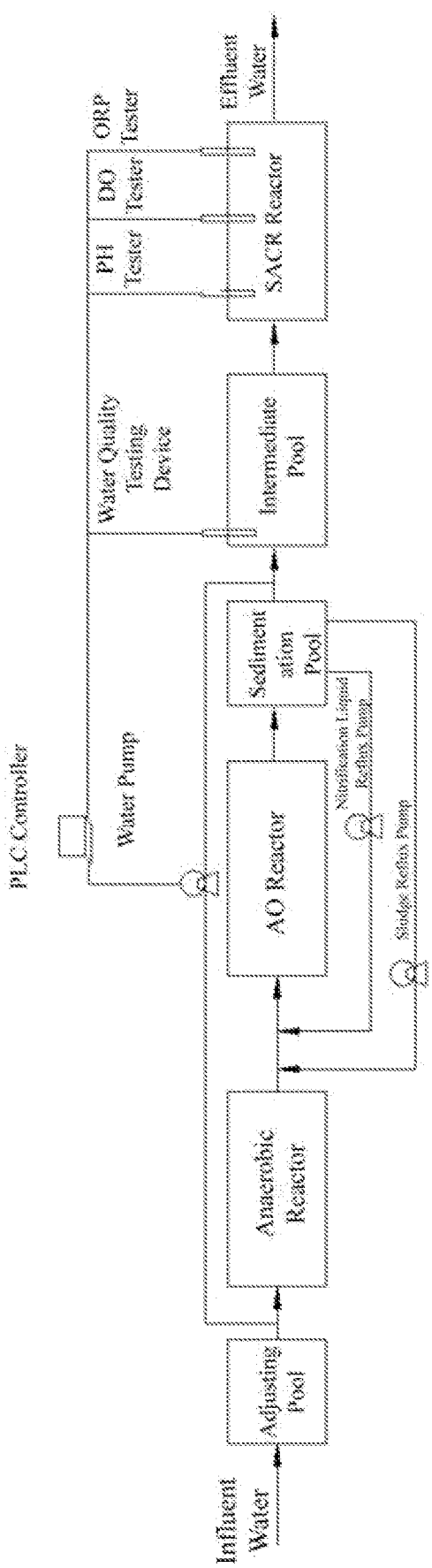
FIG. 1 is a schematic diagram of an anaerobic-AO-SACR combined advanced nitrogen removal system for high ammonia-nitrogen wastewater provided by the present invention.
Figure 2:
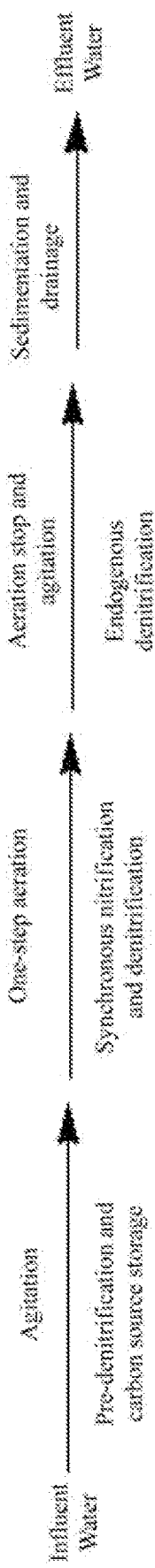
FIG. 2 is a flow chart of the working principle of an SACR reactor of the present invention.

Embodiment 1: An anaerobic-AO-SACR combined advanced nitrogen removal system for high ammonia-nitrogen wastewater As shown in FIG. 1, an anaerobic-AO-SACR combined advanced nitrogen removal system for high ammonia-nitrogen wastewater, comprises an adjusting pool, an anaerobic reactor, an AO reactor, a sedimentation pool, an intermediate pool and an SACR reactor which are communicated in sequence through pipelines; The outlet end of the adjusting pool is communicated with the inlet end of the intermediate pool through a pipeline, and the pipeline is provided with a water pump for adjusting the flow; the AO reactor is divided into an anoxic zone and an aerobic zone, and provided with a nitrification liquid reflux pump for a part of nitrification liquid obtained by separation of sludge and water in the sedimentation pool to return to the anoxic zone and a sludge reflux pump for a part of sludge obtained by separation of sludge and water in the sedimentation pool to return to the anoxic zone; the intermediate pool is provided with a water quality testing device; the SACR reactor is provided with a PH tester, a DO tester, an ORP tester, an aerator and an agitator; The anaerobic-AO-SACR combined advanced nitrogen removal system for high ammonia-nitrogen wastewater further comprises a PLC controller, wherein the PLC controller is respectively in communication connection with the water quality testing device, the PH tester, the DO tester, the ORP tester, the aerator and the agitator.

In the embodiment, the anaerobic reactor is a UASB reactor or an IC reactor.

The inventor discovers in the experiment that denitrifying bacteria have the characteristic of storing carbon sources and are a kind of facultative bacteria which can breathe in aerobic or anoxic conditions. When wastewater is in the anaerobic state and contains a lot of organic matters, denitrifying bacteria absorb the organic matters in the wastewater, forming an internal carbon source; and when wastewater lacks organic matters but contains nitric nitrogen or nitrite nitrogen and has low dissolved oxygen (<0.1 mg/L), denitrifying bacteria use the internal carbon source stored therein for anaerobic respiration to obtain energy, i.e., endogenous denitrification occurs.

The inventor designs the technical solution based on the characteristics of denitrifying bacteria, which can realize advanced nitrogen removal of high ammonia-nitrogen wastewater, wherein the SACR reactor and the technology play a vital role in advanced nitrogen removal, and the working principle is as follows: the water quality testing device, the water pump and the PLC controller are used to adjust the carbon nitrogen ratio of influent water of the SACR reactor so that the COD concentration of mixed wastewater in the intermediate pool is equal to 4-6 times of the sum of the total nitrogen concentration of effluent water of the AO reactor and the ammonia nitrogen concentration of influent water of the intermediate pool; After wastewater enters the SACR reactor, the SACR reactor first performs anoxic agitation, and denitrifying bacteria perform nitrogen removal by pre-denitrification by the raw water carbon source of high ammonia-nitrogen wastewater in the anoxic condition and absorb carbon sources in the high ammonia-nitrogen wastewater; when the pH value is monitored by the PH tester and the PLC controller to change from increase to decrease, the stage of pre-denitrification is over; after T hours, wherein T ranges from 0 to 2, agitation is stopped, aeration is started in the SACR reactor, and nitrifying bacteria conduct aerobic respiration and nitrification to convert ammonia nitrogen in the wastewater to nitrite nitrogen and nitric nitrogen; when the pH value is monitored by the PH tester, the DO tester and the PLC controller to change from decrease to increase, and DO substantially increases, nitrification is over; at this time, aeration is stopped, and agitation is continued; denitrifying bacteria use the carbon sources stored therein for anaerobic respiration in the anoxic condition and in the presence of abundant nitric nitrogen and nitrite nitrogen; based on the characteristic, the stage of endogenous denitrification is started in the reactor, which has good effects on removal of total nitrogen; when ORP is monitored by the ORP detector and the PLC controller to substantially decrease, the stage of denitrification is over; and at this time, agitation is stopped, and sedimentation and drainage are carried out. The difficult problem of advanced nitrogen removal of high ammonia-nitrogen wastewater can be effectively solved through three stages of pre-denitrification, nitrification and endogenous denitrification.

Embodiment 2: An anaerobic-AO-SACR combined advanced nitrogen removal technology for high ammonia-nitrogen wastewater The technology in the embodiment is based on the system in embodiment 1, and the anaerobic reactor is a UASB reactor; for the AO reactor, volume of anoxic zone=(total nitrogen concentration of high ammonia-nitrogen wastewater/50×3×wastewater output per hour) $m^3$, and volume of aerobic zone=(total nitrogen concentration of high ammonia-nitrogen wastewater/50×12×wastewater output per hour) $m^3$; volume of SACR=(total nitrogen concentration of high ammonia-nitrogen wastewater/50×20×wastewater output per hour) $m^3$; and the total nitrogen concentration of the high ammonia-nitrogen wastewater is in mg/L, and the wastewater output per hour is in $m^3$.

An anaerobic-AO-SACR combined advanced nitrogen removal technology for high ammonia-nitrogen wastewater, comprises the following steps:

(1) High ammonia-nitrogen wastewater enters the anaerobic reactor from the adjusting pool, wherein the volume load of the anaerobic reactor is 6 KgCOD/$m^3$·day, macromolecular and refractory organic matters in the high ammonia-nitrogen wastewater are decomposed into small molecules, and most of organic matters in the high ammonia-nitrogen wastewater are removed;

(2) The effluent water of the anaerobic reactor enters the AO reactor for pre-denitrification in the anoxic zone and aerobic nitrification in the aerobic zone; sludge water mixture undergoes sludge water separation in the sedimentation pool, one part of effluent water enters the intermediate pool, and the other part returns to the front end of the anoxic zone through the nitrification liquid reflux pump of the AO reactor for pre-denitrification; and one part of sludge returns to the front end of the anoxic zone through the sludge reflux pump of the AO reactor, and the other part is drained as the remaining sludge; wherein the sludge concentration of the AO technology is controlled at 4500 mg/L, the reflux ratio of nitrification liquid is 150%, and the reflux ratio of sludge is 75%;

(3) The effluent water of the AO reactor enters the intermediate pool, and meanwhile, under the adjustment and control of the water quality testing device and the PLC controller, a part of high ammonia-nitrogen wastewater is introduced by the water pump into the intermediate pool from the adjusting pool to adjust the carbon nitrogen ratio of the wastewater; and the adjustment rule of the carbon nitrogen ratio of the wastewater is: COD concentration of mixed wastewater=total nitrogen concentration of effluent water of AO reactor×b+ammonia nitrogen concentration of influent water of intermediate pool×b, wherein b is 4;

(4) After entering the SACR reactor from the intermediate pool, the wastewater first undergoes anoxic agitation; when the pH value changes from increase to decrease, the pre-denitrification in the SACR reactor is over; at this time, agitation is stopped, and aerated nitrification is started; when the pH value in the SACR reactor changes from decrease to increase, and dissolved oxygen substantially increases, the nitrification in the SACR reactor is over; at this time, aeration is closed, agitation is continued, endogenous denitrification is started, and the change of ORP in the SACR reactor is observed; when the ORP in the SACR reactor decreases rapidly, the denitrification in the SACR reactor is over; and at this time, agitation is closed, and sedimentation and drainage are carried out; wherein the sludge concentration of the SACR technology is controlled at 6000 mg/L, the drainage ratio is controlled at 30%, the inflow time is 30 min, and the sedimentation time is 60 min.

Figure 3:
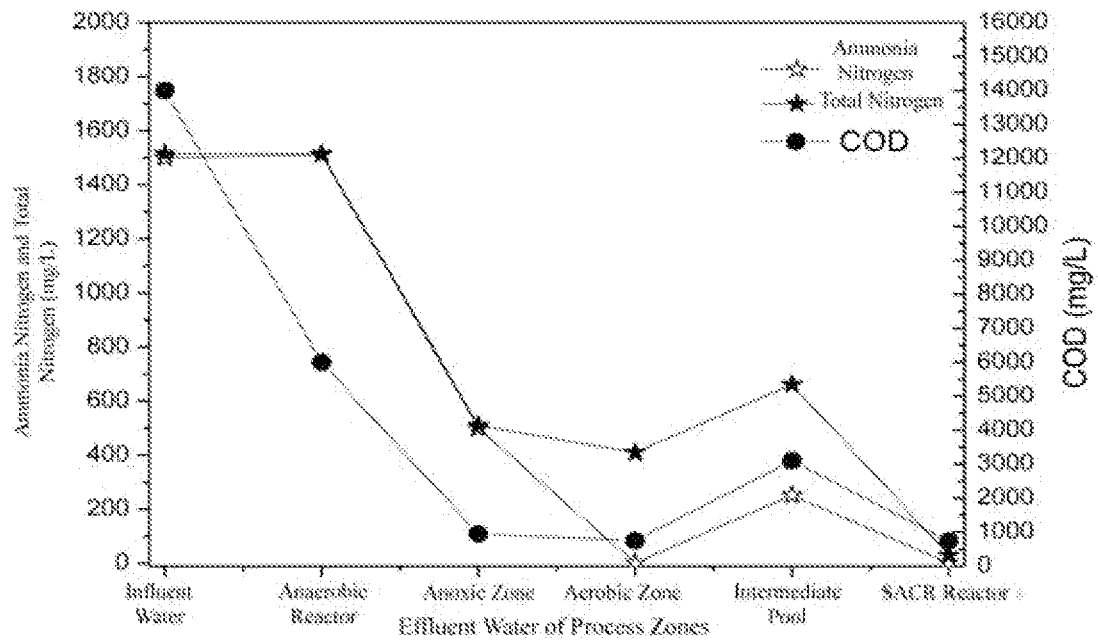
FIG. 3 shows the removal condition of pollutants in each functional zone of the present invention.

In the embodiment, the UASB+AO+SACR combined technology is adopted, and the treated object is landfill leachate with COD of 14000 mg/L±200 mg/L and ammonia nitrogen concentration of 1500 mg/L±100 mg/L. The removal condition and the removal rate of pollutants in each functional zone of the system are shown in FIG. 3. It can be known from FIG. 3 that after the leachate enters the UASB reactor, COD decreases obviously, and the removal rate reaches about 60%. Subsequently, the leachate is treated by the AO reactor, COD, ammonia nitrogen and total nitrogen of effluent water are respectively 750 mg/L, 1.2 mg/L and 420 mg/L, and the removal rates of COD, ammonia nitrogen and total nitrogen respectively reach about 95%, 99% and 73%. Through the adjustment of the intermediate pool, COD, ammonia nitrogen and total nitrogen of the leachate are respectively 3100 mg/L, 252 mg/L and 662 mg/L. Then the leachate enters the SACR reactor for final nitrogen removal. The COD concentration, the ammonia nitrogen concentration and the total nitrogen concentration of effluent water of SACR are respectively 732 mg/L, 1.1 mg/L and 30 mg/L. The removal rates of COD, ammonia nitrogen and total nitrogen respectively reach about 95%, 99% and 98%, realizing advanced nitrogen removal of the leachate.

Figure 4:
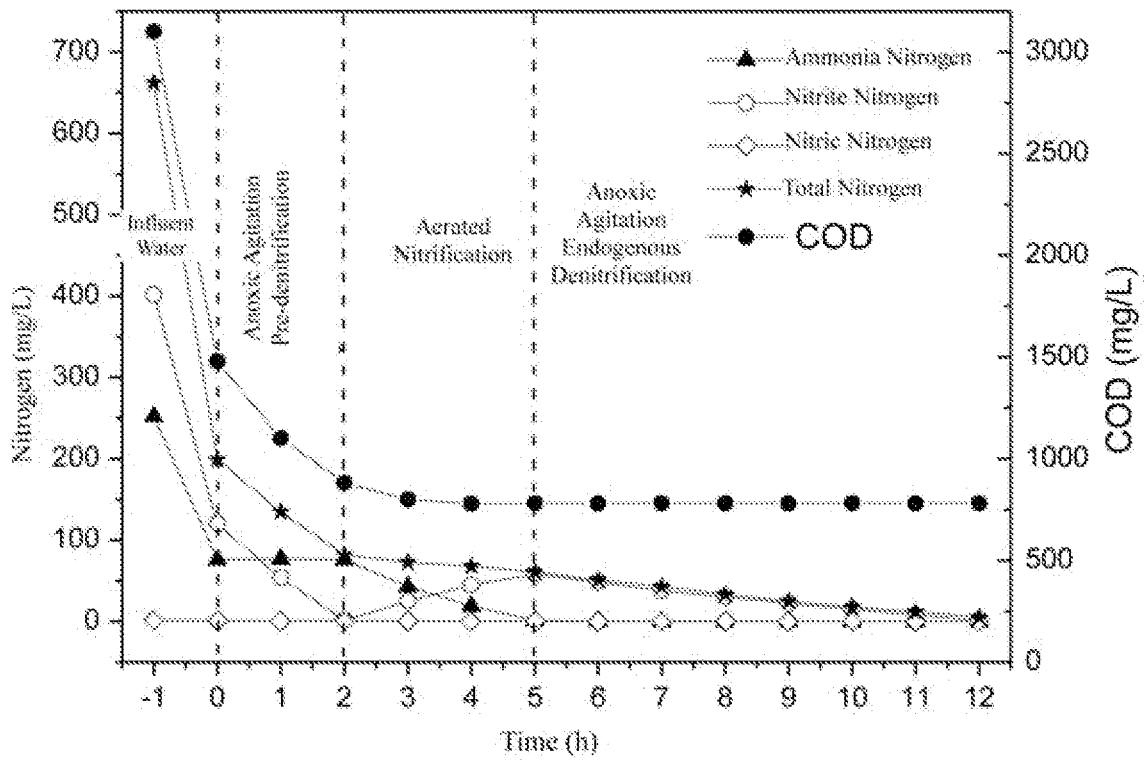
FIG. 4 shows the change condition of pollutants within one period of SACR of the present invention.

The change condition of pollutants within one period of SACR is shown in FIG. 4.

It can be known from FIG. 4 that the COD concentration, the ammonia nitrogen concentration and the total nitrogen concentration of influent water of the SACR reactor are respectively 3100 mg/L, 252 mg/L and 662 mg/L. After the wastewater enters, the concentration of pollutants decreases to a certain degree due to dilution effect. Then anoxic agitation is started in the reactor. During agitation, COD, total nitrogen and nitrite nitrogen of the wastewater decrease obviously due to pre-denitrification, but the ammonia nitrogen concentration shows no obvious change. When pre-denitrification is over, nitrite nitrogen in the wastewater is denitrified completely, and the concentration is almost 0 mg/L. Therefore, the total nitrogen decreases obviously, from 199 mg/L at the initial stage of the reaction to 82 mg/L, and COD decreases from 1480 mg/L at the initial stage of the reaction to 882 mg/L. Subsequently, agitation is stopped in the SACR reactor, aeration is stared, the ammonia nitrogen concentration gradually decreases, and the COD concentration also decreases to a certain degree; and after 3 hours, nitrification is over, the ammonia nitrogen concentration is almost 0 mg/L, the COD concentration is 781 mg/L, and the rest are refractory organic matters. The total nitrogen concentration decreases from 82 mg/L at the beginning of aeration to 61 mg/L due to occurrence of synchronous nitrification and denitrification during aeration. Subsequently, anoxic agitation is continued in the SACR reactor, and endogenous pre-denitrification occurs. During the process of endogenous denitrification, COD and ammonia nitrogen are basically unchanged, but the nitrite nitrogen concentration and the total nitrogen concentration continuously decrease, indicating that sludge undergoes nitrogen removal by denitrification by using the internal carbon source. At the $12^{th}$ hour of the reaction, both nitrite nitrogen and ammonia nitrogen in the SACR reactor are degraded completely, the total nitrogen concentration is 5 mg/L, and advanced nitrogen removal of the leachate is realized.

The above specific embodiments are only the specific cases of the present invention. The protection scope of the patent of the present invention includes but is not limited to the product form and style of the above specific embodiments, and any appropriate change or modification conforming to the claims of the present invention and made to the present invention by those ordinary skilled in the art shall fall into the protection scope of the patent of the present invention.

What is claimed is:

1. An anaerobic-anoxic/oxic-self-carbon source adaptive reactor (anaerobic-AO-SACR) combined advanced nitrogen removal system for high ammonia-nitrogen wastewater comprising:
   an adjusting pool, an anaerobic reactor, an AO reactor, a sedimentation pool, an intermediate pool and a SACR which are communicated in sequence through pipelines;
   an outlet of the adjusting pool is communicated with an inlet of the intermediate pool through a pipeline, and the pipeline is provided with a water pump for adjusting the flow;
   the AO reactor is divided into an anoxic zone and an aerobic zone, and is provided with a nitrification liquid reflux pump for a part of nitrification liquid obtained by separation of sludge and water in the sedimentation pool to return to the anoxic zone and a sludge reflux pump for a part of sludge obtained by separation of sludge and water in the sedimentation pool to return to the anoxic zone;
   the intermediate pool is provided with a water quality testing device;
   the SACR is provided with a pH tester, a DO tester, an ORP tester, an aerator and an agitator;
   the SACR is configured to:
      after wastewater entering the SACR from the intermediate pool, the wastewater first undergoes anoxic agitation, when a pH value of the wastewater changes from increasing to decreasing, a pre-denitrification of the wastewater in the SACR is over;
      after T hours, agitation is stopped, and aerated nitrification is started; when a pH value of the pre-denitrificated wastewater in the SACR changes from decreasing to increasing, and DO increasing, a nitrification of the pre-denitrificated wastewater in the SACR is over;

at this time, aeration is closed, agitation is continued, endogenous denitrification is started, and a change of ORP in the SACR is observed; when the ORP in the SACR decreasing, the denitrification of the nitrificated wastewater in the SACR is over;

and at this time, agitation is closed, and sedimentation and drainage are carried out;

further comprising a PLC controller, wherein the PLC controller is respectively in communication connection with the water quality testing device, the pH tester, the DO tester, the ORP tester, the aerator and the agitator.

2. The anaerobic-AO-SACR combined advanced nitrogen removal system for high ammonia-nitrogen wastewater according to claim 1, wherein:

the volume of the anoxic zone of the AO reactor and the volume of the aerobic zone of the AO reactor are determined according to the output of wastewater and the total nitrogen concentration of pollutants;

volume of the anoxic zone=a×(total nitrogen concentration of high ammonia-nitrogen wastewater/50×3×wastewater output per hour) $m^3$, and volume of the aerobic zone=a×(total nitrogen concentration of high ammonia-nitrogen wastewater/50×12×wastewater output per hour) $m^3$; wherein a ranges from 1 to 1.5, the total nitrogen concentration of the high ammonia-nitrogen wastewater is in mg/L, and the wastewater output per hour is in $m^3$.

3. The anaerobic-AO-SACR combined advanced nitrogen removal system for high ammonia-nitrogen wastewater according to claim 1, wherein:

the volume of the SACR is determined according to the output of wastewater and the concentration of pollutants;

volume of SACR=a×(total nitrogen concentration of high ammonia-nitrogen wastewater/50×20×wastewater output per hour) $m^3$; wherein a ranges from 1 to 1.5, the total nitrogen concentration of the high ammonia-nitrogen wastewater is in mg/L, and the wastewater output per hour is in $m^3$.

4. The anaerobic-AO-SACR combined advanced nitrogen removal system for high ammonia-nitrogen wastewater according to claim 1, further comprising: a computer, wherein the computer is in communication connection with the PLC controller.

5. An anaerobic-AO-SACR combined advanced nitrogen removal method for high ammonia-nitrogen wastewater by the system according to claim 2 comprising the following steps:

(1) high ammonia-nitrogen wastewater enters the anaerobic reactor from the adjusting pool, macromolecular and refractory organic matters in the high ammonia-nitrogen wastewater are decomposed into small molecules, and most of organic matters in the high ammonia-nitrogen wastewater are removed;

(2) an effluent water of the anaerobic reactor enters the AO reactor for pre-denitrification in the anoxic zone and aerobic nitrification in the aerobic zone; thereafter the effluent water looks like a sludge water mixture, which undergoes sludge water separation in the sedimentation pool, one part of effluent water enters the intermediate pool, and the other part returns to the front end of the anoxic zone through the nitrification liquid reflux pump of the AO reactor for pre-denitrification; and one part of sludge returns to the front end of the anoxic zone through the sludge reflux pump of the AO reactor, and the other part is drained as the remaining sludge;

(3) the one part of effluent water of the AO reactor enters the intermediate pool, under the adjustment and control by the water quality testing device and the PLC controller, a part of high ammonia-nitrogen wastewater of the adjusting pool is introduced by the water pump into the intermediate pool to adjust the carbon nitrogen ratio:

after wastewater entering the SACR from the intermediate pool, the wastewater first undergoes anoxic agitation, when a pH value of the wastewater changes from increasing to decreasing, a pre-denitrification of the wastewater in the SACR is over; after T hours, agitation is stopped, and aerated nitrification is started; when a pH value of the pre-denitrificated wastewater in the SACR changes from decreasing to increasing, and DO increasing, the nitrification of the pre-denitrificated wastewater in the SACR is over; at this time, aeration is closed, agitation is continued, endogenous denitrification is started, and a change of ORP in the SACR is observed; when the ORP in the SACR decreasing, the denitrification of the nitrificated wastewater in the SACR is over; and at this time, agitation is closed, and sedimentation and drainage are carried out.

6. The anaerobic-AO-SACR combined advanced nitrogen removal method for high ammonia-nitrogen wastewater according to claim 5, wherein T ranges up to 2.

7. The anaerobic-AO-SACR combined advanced nitrogen removal method for high ammonia-nitrogen wastewater according to claim 5, wherein the carbon nitrogen ratio of wastewater of the anaerobic reactor is more than 5:1, and the volume load of the anaerobic reactor is 4-8 KgCOD/$m^3$·day.

8. The anaerobic-AO-SACR combined advanced nitrogen removal method for high ammonia-nitrogen wastewater according to claim 5, wherein the sludge concentration of the AO reactor is controlled at 4000 mg/L-5000 mg/L, the reflux ratio of nitrification liquid is 100%-200%, and the reflux ratio of sludge is 50%-100%.

9. The anaerobic-AO-SACR combined advanced nitrogen removal method for high ammonia-nitrogen wastewater according to claim 5, wherein the sludge concentration of the SACR is controlled at 5000 mg/L-8000 mg/L, a drainage ratio is controlled at 25%-30%, an inflow time is 30-60 min, and a sedimentation time is 60-90 min.

* * * * *